United States Patent
Guo et al.

(10) Patent No.: US 7,593,423 B2
(45) Date of Patent: Sep. 22, 2009

(54) QUALITY OF SERVICE DIFFERENTIATION IN WIRELESS NETWORKS

(75) Inventors: Zihua Guo, Beijing (CN); Wenwu Zhu, Basking Ridge, NJ (US); Qian Zhang, Beijing (CN); Jun Zhao, Beijing (CN)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 10/971,519

(22) Filed: Oct. 21, 2004

(65) Prior Publication Data

US 2005/0100040 A1    May 12, 2005

Related U.S. Application Data

(63) Continuation of application No. 10/377,451, filed on Feb. 27, 2003, now Pat. No. 6,937,591.

(51) Int. Cl.
*H04L 12/413* (2006.01)
*H04L 12/403* (2006.01)
*G06F 15/16* (2006.01)

(52) U.S. Cl. .................. 370/445; 370/447; 370/458; 370/461; 709/232

(58) Field of Classification Search ......... 370/229–235, 370/252, 254, 389, 428, 311–319, 442–445, 370/449, 461, 462, 458, 236–236.2, 277–278, 370/280, 294, 336–337, 345–350; 455/422.1, 455/426.2, 445; 709/223–225, 227–228, 709/232–235

See application file for complete search history.

(56) References Cited

U.S. PATENT DOCUMENTS

| | | | |
|---|---|---|---|
| 5,889,772 A * | 3/1999 | Fischer et al. ............... 370/346 |
| 6,115,393 A | 9/2000 | Engel et al. |
| 6,965,942 B1 * | 11/2005 | Young et al. ................. 709/232 |
| 6,980,561 B1 * | 12/2005 | Abi-Nassif .................. 370/458 |
| 7,095,754 B2 | 8/2006 | Benveniste |
| 7,221,681 B2 * | 5/2007 | Choi et al. ................... 370/447 |
| 2002/0152324 A1 | 10/2002 | Sherman |
| 2002/0154653 A1 | 10/2002 | Benveniste |
| 2002/0163933 A1 * | 11/2002 | Benveniste .................. 370/465 |
| 2003/0081628 A1 * | 5/2003 | Sugar et al. ................. 370/461 |
| 2003/0103521 A1 * | 6/2003 | Raphaeli et al. ............. 370/445 |
| 2004/0004973 A1 | 1/2004 | Lee |

(Continued)

OTHER PUBLICATIONS

Aad et al., "Differentiation Mechanisms for IEEE 802.11," *IEEE INFOCOM 2001*, pp. 209-218 (2001).

(Continued)

*Primary Examiner*—Aung S Moe
*Assistant Examiner*—Redentor M Pasia
(74) *Attorney, Agent, or Firm*—Lee & Hayes, PLLC

(57) ABSTRACT

A method provides differentiated quality of service (QoS) by providing adaptive updates to media access control (MAC) layer parameters on a distributed basis. The method includes calculating a failure probability for a transmission over the network, determining a target value for determining a contention window according to a mapped function of the failure probability, and altering the contention window according to a scaling function of the target value. The mapped function and the scaling can provide QoS differentiation. A wireless device ensures fairness in a wireless time slotted network and includes a network interface card (NIC), a network driver interface, a network monitor, a statistics engine, and an adaptive parameter engine for determining a target value for determining a contention window according to a mapped function of the one or more probabilities to enable an alteration of the contention window and provide new parameters for the MAC layer.

36 Claims, 8 Drawing Sheets

U.S. PATENT DOCUMENTS

2004/0093421 A1* 5/2004 Peng et al. .......... 709/232
2004/0100936 A1 5/2004 Liu et al.

OTHER PUBLICATIONS

Ayyagari, et al., "IEEE 802.11 Quality of Service," *White Paper*, pp. 1-10 (Feb. 15, 2000).

Banchs et al., "Service Differentiation Extensions for Elastic and Real-Time Traffic in 802.11 Wireless LAN," *IEEE*, pp. 245-249 (2001).

IEEE Standard 802.11.1999, *IEEE Standard for Wireless LAN Medium Access Control (MAC) and Physical Layer (PHY) Specification*, IEEE (1999).

Veres et al., "Supporting Service Differentiation in Wireless Packet Networks Using Distributed Control," *IEEE Journal on Selected Areas in Communications*, vol. 19, No. 10, pp. 2081-2093 (2001).

Zhao et al., "Performance Study of MAC for Service Differentiation in IEEE 802.11", Microsoft Research—Asia, 5pgs.

Aad, et al, "Differentiation Mechanisms for IEEE 802.11", IEEE InfoCom, 2001, pp. 209-218.

Ayyagari, et al, "IEEE 802.11 Quality of Service", White Paper, Feb. 15, 2000, pp. 1-10.

Banchs, et al, "Service Differentiation Extensions for Elastic and Real-Time Traffic in 802.11 Wireless LAN", IEEE, 2001, pp. 245-249.

IEEE Standard for Wireless LAN Medium Access Control (MAC) and Physical Layer (PHY) Specification, IEEE, 1999.

Veres, et al, "Supporting Service Differentiation in Wireless Packet Networks Using Distributed Control", vol. 19, No. 10, 2001, pp. 2081-2093.

Zhao, et al, "Performance Study of MAC for Service Differentiation in IEEE 802.11", Microsoft Research—Asia.

* cited by examiner

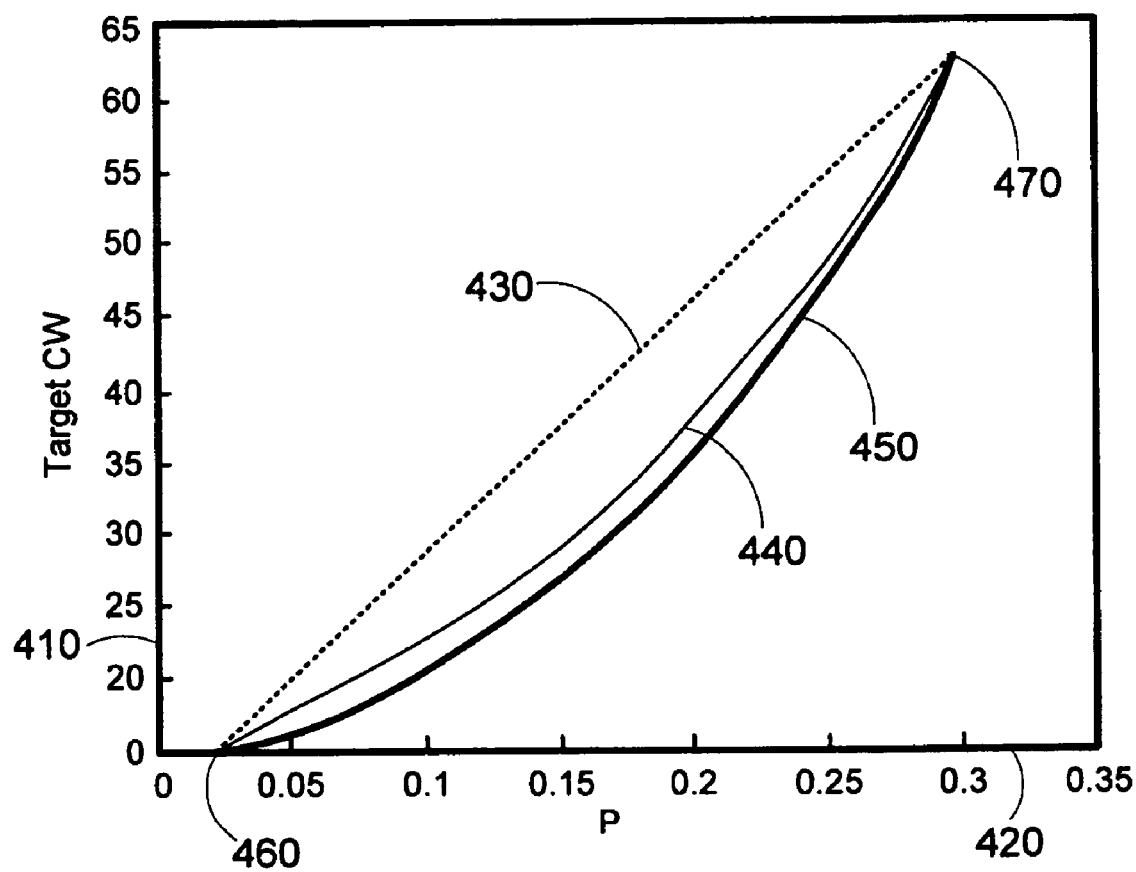

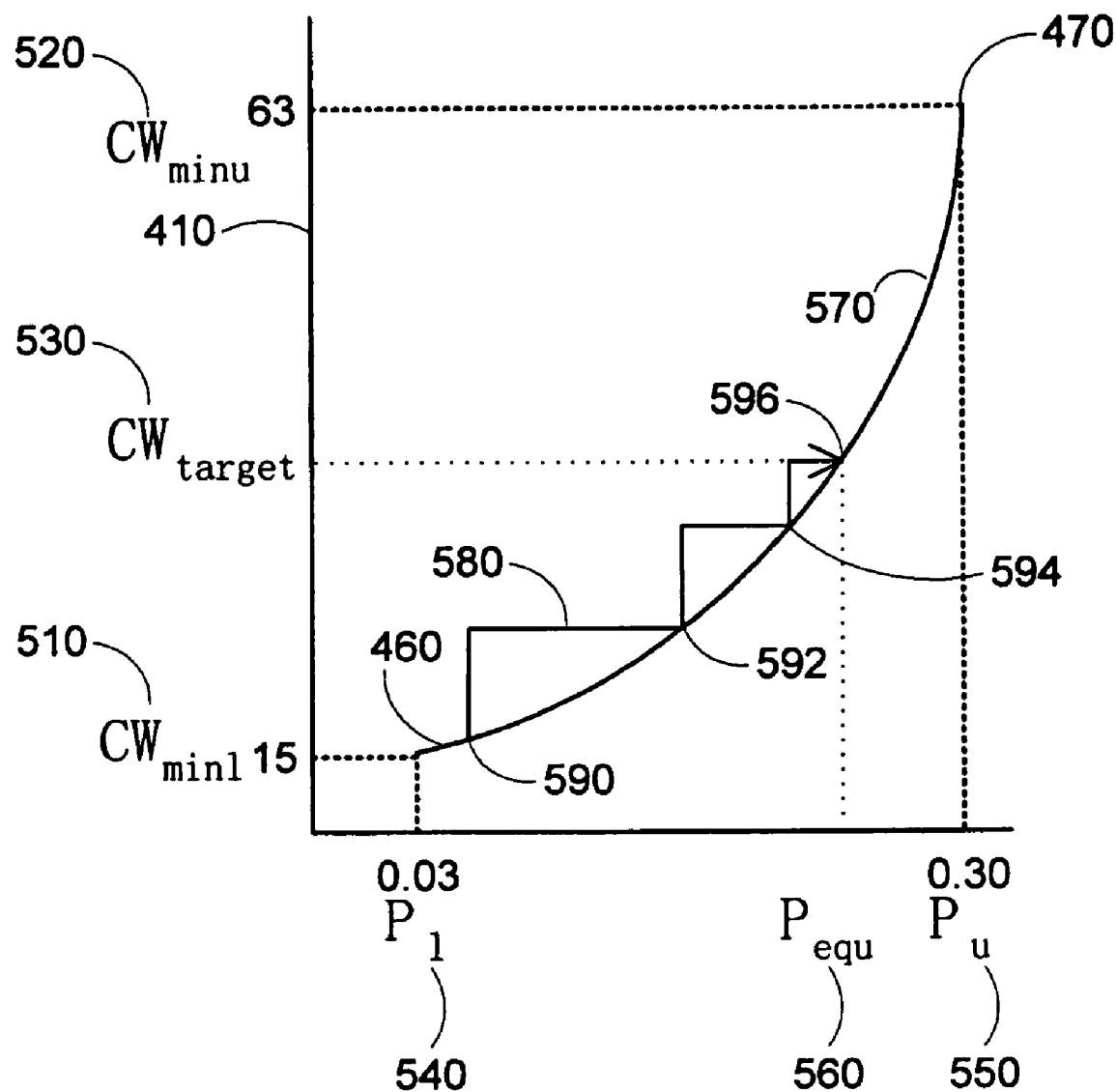

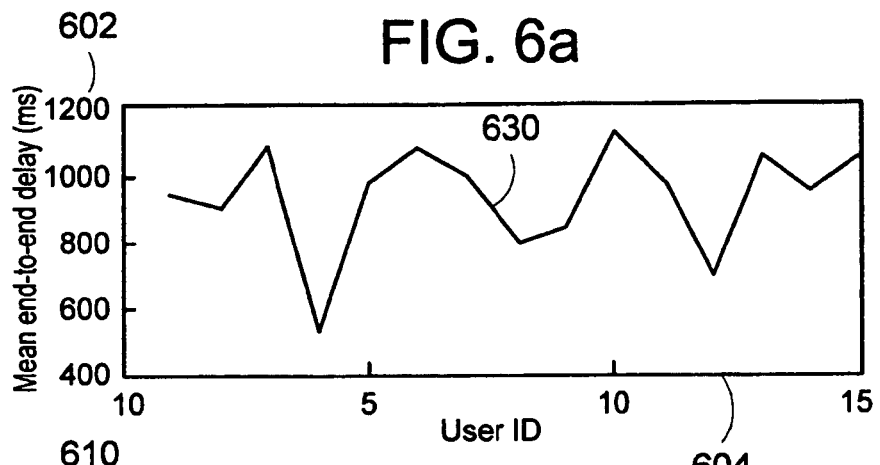
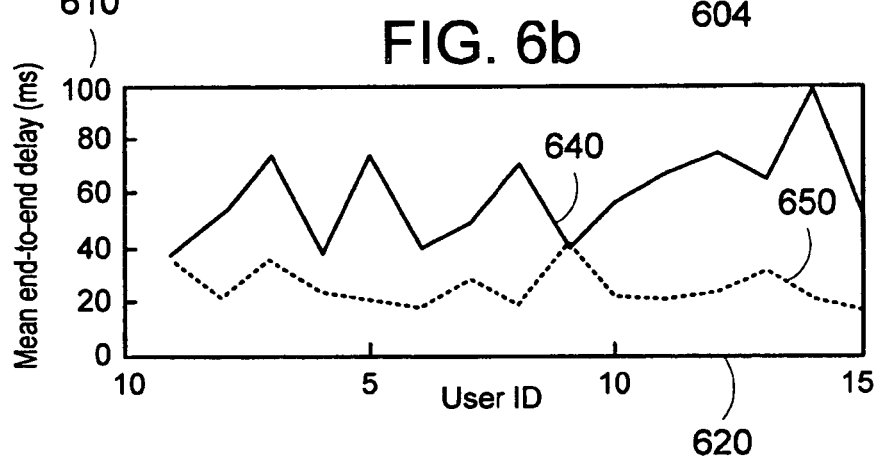
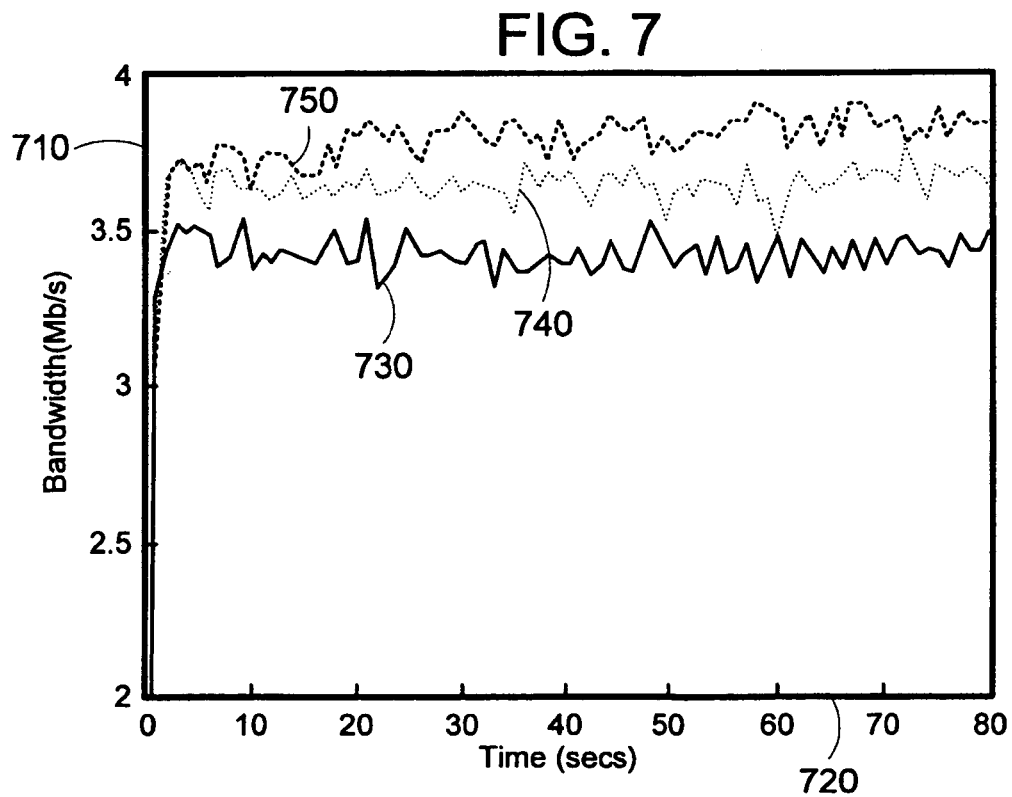

QUALITY OF SERVICE DIFFERENTIATION IN WIRELESS NETWORKS

CROSS-REFERENCE TO RELATED PATENT APPLICATIONS

This patent application is a continuation of a U.S. patent application Ser. No. 10/377,451, filed Feb. 27, 2003 now U.S. Pat. No. 6,937,591 entitled "QUALITY OF SERVICE DIFFERENTIATION IN WIRELESS NETWORKS."

FIELD OF THE INVENTION

This invention relates generally to computer systems and, more particularly, relates to differentiation for quality of service of computer systems and computer devices.

BACKGROUND OF THE INVENTION

Wireless networks are becoming more and more popular. With the popularity of wireless networks increasing, users also demand broader coverage from a wireless network, such as voice, video and data communication support. With the broader demands placed on wireless networks, more complex mechanisms are required for differentiated services. For example, users with higher priorities need to be guaranteed higher bandwidth than lower priority users. Unfortunately, wireless local area network (WLAN) protocols such as IEEE 802.11 protocols are designed for best-effort data communications without quality of service (QoS) support.

The current 802.11 protocol has a Media Access Control (MAC) layer that provides a distributed coordination function (DCF) based on a carrier sense multiple access with collision avoidance (CSMA/CA) protocol. According to the CSMA/CA protocol, packet transmissions occur after two waiting periods. First, a channel is sensed idle for a first waiting period termed a DCF interframe spacing (DIFS) period. The second waiting period is an additional backoff period, which is a random time period.

The MAC layer protocol sets the backoff period according to a contention window. A contention window (CW) is a range of values from which a random backoff period is chosen. Specifically, before transmission, a backoff period is computed by finding a random value in the range from 0 to the CW. The backoff period is then computed using the random value: Backoff=Rand (0, CW) * $T_{slot}$. $T_{slot}$ represents a slot time. The time following an idle DIFS is slotted and transmissions only occur at a beginning of a slot. The backoff period is used to initialize a backoff procedure. If the channel is idle, the timer is decreased. If another transmission is detected, the timer is frozen. Each time the channel is idle for a period longer than the DIFS, the backoff timer is periodically decremented once each slot time. If a transmission attempt is unsuccessful, the CW is doubled until a predetermined maximum for CW is reached. Thus, the CW is used to determine the random backoff period before attempting a packet transmission. In the MAC layer for the IEEE 802.11 protocol, the parameters are set to be identical for all types of traffic. In particular, at the start of a transmission, the initial contention window ($CW_{min}$) is set to be 31 for each flow and the QoS Interframe Spacing (QIFS) is equally set to the DIFS period for all users. As a result, each device is treated identically and no service differentiation is available. Because of the lack of service differentiation, the performance of the multimedia types of traffic and any real time traffic with various QoS requirements is unsatisfactory in current WLAN systems. For purposes of this disclosure, if not specified, the contention window denotes the $CW_{min}$.

BRIEF SUMMARY OF THE INVENTION

Accordingly, a method, wireless device and computer system provide differentiated quality of service (QoS) by providing adaptive updates to media access control (MAC) layer parameters on a distributed basis. The method includes calculating a failure probability for a transmission over the network, determining a target value for determining a contention window according to a mapped function of the failure probability, and altering the contention window according to a scaling function of the target value. Both the mapped function of the target value and the scaling can provide QoS differentiation for transmissions. In an embodiment, the method provides for fairness among users by providing that altering of the contention window only occurs when (1) a prior change to the contention window was an increase and the failure probability is less than a prior failure probability and (2) the prior change to the contention window was a decrease and the failure probability is greater than the prior failure probability.

The method can be performed every predetermined number of attempted transmissions. Therefore, after a certain number of iterations through the method, the contention window converges to the target value.

Another embodiment is directed to a wireless device capable of ensuring fairness in a wireless time slotted network. The wireless device includes a network interface card (NIC) configured to transmit and receive signals to the wireless time slotted network, a network driver interface coupled to the NIC to provide statistical parameters concerning the wireless time slotted network, a network monitor coupled to the network driver interface to monitor network statistics, a statistics engine coupled to at least the network monitor to receive the statistical parameters and perform operations on the statistical parameters to determine one or more probabilities, and an adaptive parameter engine for determining a target value for determining a contention window according to a mapped function of the one or more probabilities to enable an alteration of the contention window.

The adaptive parameter engine applies a scaling function of the target value according to a differentiated quality of service (QoS) for transmitting across the network. More particularly, the adaptive parameter engine determines new parameters for a media access control (MAC) layer as maintained by the network driver interface to provide quality of service (QoS) differentiation.

Additional features and advantages of the invention will be made apparent from the following detailed description of illustrative embodiments, which proceeds with reference to the accompanying figures.

BRIEF DESCRIPTION OF THE DRAWINGS

While the appended claims set forth the features of the present invention with particularity, the invention, together with its objects and advantages, can be best understood from the following detailed description taken in conjunction with the accompanying drawings of which:

FIG. 4 is a graph illustrating a mapping function according to an embodiment of the present invention.

FIG. 5 is a graph illustrating convergence to a target contention window according to an embodiment of the present invention.

FIG. 6A is a graph illustrating a mean end-to-end delay in current 802.11 transmissions.

FIG. 6B is a graph illustrating mean end-to-end delay in 802.11 transmissions using fixed differentiation and an adaptive contention window method according to embodiments of the present invention.

FIG. 7 is a graph illustrating throughput of transmissions comparing the adaptive contention window method according to embodiments of the present invention with current 802.11 transmissions and a fixed differentiation scheme.

DETAILED DESCRIPTION OF THE INVENTION

Figure 1:
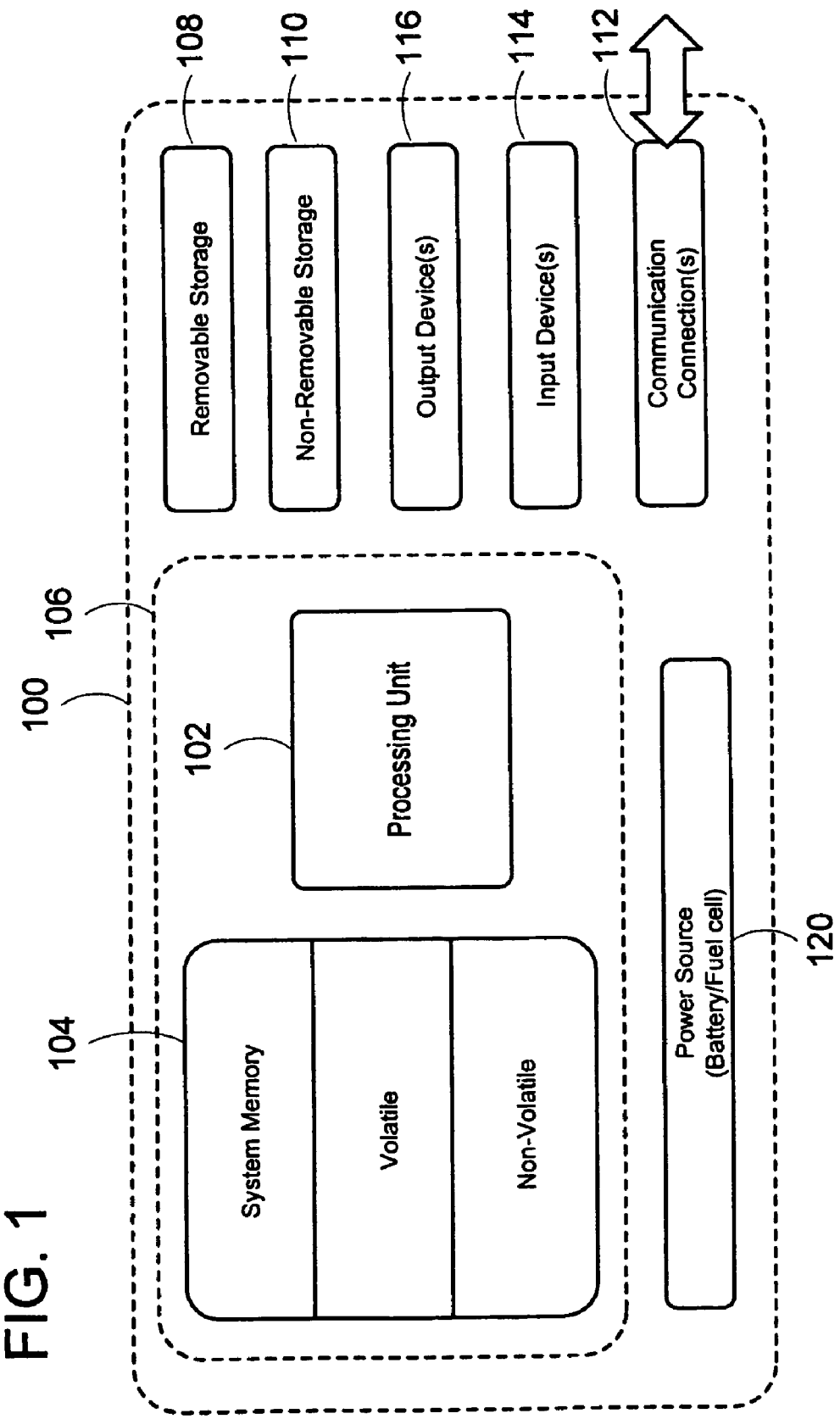
FIG. 1 is a block diagram generally illustrating an exemplary computer system on which the present invention resides.

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

The invention may be implemented in a system employing various types of machines, including cell phones, hand-held devices, wireless surveillance devices, microprocessor-based programmable consumer electronics, and the like, using instructions, such as program modules, that are executed by a processor. Generally, program modules include routines, objects, components, data structures and the like that perform particular tasks or implement particular abstract data types. The term "program" includes one or more program modules.

FIG. 1 shows an exemplary computing device 100 for implementing one or more embodiments of the invention. In its most basic configuration, the computing device 100 includes at least a processing unit 102 and a memory 104. Depending on the exact configuration and type of computing device, the memory 104 may be volatile (such as RAM), non-volatile (such as ROM, flash memory, etc.) or some combination of the two. The basic configuration is illustrated in FIG. 1 by a dashed line 106. Additionally, the device 100 may also have additional features/functionality. For example, the device 100 may also include additional storage (removable and/or non-removable) including, but not limited to, magnetic or optical disks or tapes. Such additional storage is illustrated in FIG. 1 by a removable storage 108 and a non-removable storage 110. Computer storage media includes volatile and nonvolatile, removable and non-removable media implemented in any method or technology for storage of information such as computer readable instructions, data structures, program modules or other data. The memory 104, the removable storage 108 and the non-removable storage 110 are all examples of computer storage media. Computer storage media includes, but is not limited to, RAM, ROM, EEPROM, flash memory or other memory technology, CDROM, digital versatile disks (DVD) or other optical storage, magnetic cassettes, magnetic tape, magnetic disk storage or other magnetic storage devices, or any other medium which can be used to store the desired information and which can accessed by the device 100. Any such computer storage media may be part of the device 100.

Device 100 may also contain one or more communications connections 112 that allow the device to communicate with other devices. The communications connections 112 are an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. As discussed above, the term computer readable media as used herein includes both storage media and communication media Device 100 may also have one or more input devices 114 such as keyboard, mouse, pen, voice input device, touch-input device, etc. One or more output devices 116 such as a display, speakers, printer, etc. may also be included. All these devices are well known in the art and need not be discussed at greater length here.

In keeping with the intended application of the invention, device 100 is configured as a wireless mobile device. To that end, device 100 is provided with a portable power source 120, such as a battery pack, a fuel cell, or the like. The power source 120 provides power for computations and wireless data transmissions by the device 100.

Figure 2:
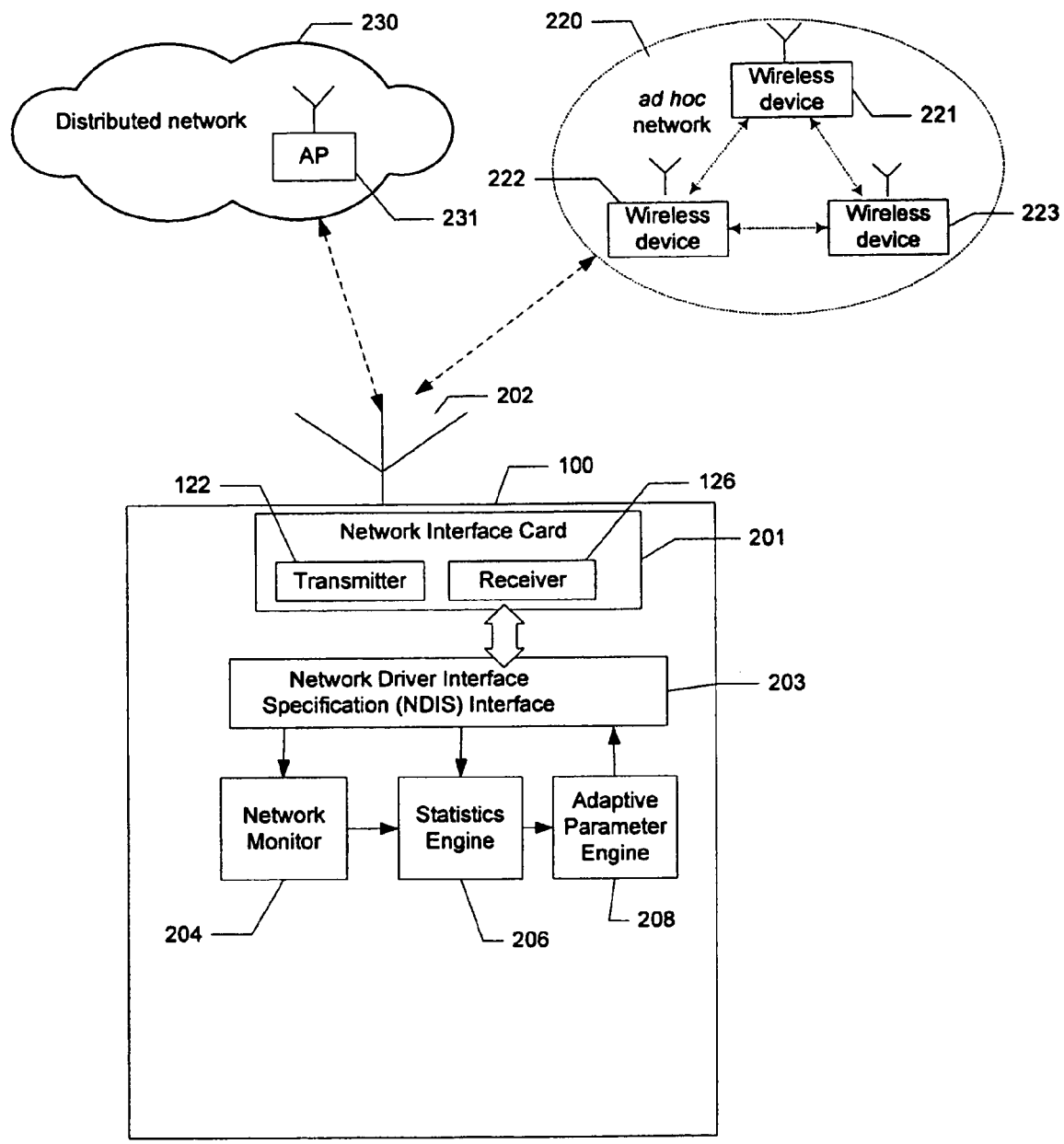
FIG. 2 is block diagram of a wireless device connected to a wireless network in accordance with an embodiment of the present invention.

Referring now to FIG. 2, the wireless computing device 100 further includes a network interface card (NIC) 201 for wirelessly communicating with different types of wireless networks. The NIC 201 includes a transmitter 122, which is coupled to an antenna 202 for transmitting data wirelessly over a suitable frequency channel. A receiver 126 is also coupled to the antenna 202 for receiving communication packets wirelessly transmitted from the networks. The network interface module 201 and the antenna 202 are part of the communication connections 112 in FIG. 1. In one embodiment, the network interface card 201 employs wireless configuration service over IEEE 802.11 wireless connections to ease network configuration, including infrastructure networks and ad hoc networks. An exemplary network interface card is a PCMCIA wireless card. It will be appreciated that the interface type and physical configuration of the network interface card is not critical to the invention. For instance, the interface type could be PCI or another type and the network interface module does not have to reside on a separate card. It may be included on the motherboard of the computer or even possibly built into the processor in the future.

Through the wireless network interface card, wireless computing device 100 may communicate with different types of wireless networks. For instance, in the illustrated environment of FIG. 2, the wireless device 100 may be connected wirelessly to an infrastructure network 230 through an access point 231 thereof. The wireless device 100 may also be part of a peer-to-peer network 220, also referred to as an ad hoc network, that includes other wireless devices, such as the wireless devices 221, 222, and 223. Before connecting to either the access point 231 of the infrastructure network or the ad hoc network 220, the wireless device 100 may be in a state of searching for devices that belong to the network by periodically scanning actively by sending probe requests and scanning for probe response signals transmitted by the access point or other devices. Alternatively, the wireless device 100 may search passively by scanning for beacons transmitted by Access Points.

A network driver interface specification (NDIS) interface 203 controls the operation of the network interface card 201. The network driver interface 203 is either part of the operating system of the wireless device 100 or a separate executable program running on the wireless device 100. According to embodiments of the present invention, an exemplary NDIS interface 203 is according to IEEE 802.11 specifications and includes statistical data concerning the network traffic sent and received via transmitter 122 and receiver 126.

The NDIS interface 203 provides objects that are useful for implementing one or more methods described herein. For example, one of the metrics available via the NDIS interface is an object named OBJ_802_11_STATISTICS. The object provides statistics useful for determining a collision probability:

```
OBJ_802_11_STATISTICS
{
    ULONG           Length;
    LARGE_INTEGER   TransmittedFragmentCount;
    LARGE_INTEGER   MulticastTransmittedFrameCount;
    LARGE_INTEGER   FailedCount;
    LARGE_INTEGER   RetryCount;
    LARGE_INTEGER   MultipleRetryCount;
    LARGE_INTEGER   RTSSuccessCount;
    LARGE_INTEGER   RTSFailureCount;
    LARGE_INTEGER   ACKFailureCount;
    LARGE_INTEGER   FrameDuplicateCount;
    LARGE_INTEGER   ReceivedFragmentCount;
    LARGE_INTEGER   MulticastReceivedFrameCount;
    LARGE_INTEGER   FCSErrorCount;
};
```

Regarding the parameters from NDIS interface 203, "TransmittedFragmentCount" provides the number of data and management fragments that a network interface card (NIC) has successfully transmitted. "MulticastTransmittedFrameCount" provides the number of frames that the NIC has transmitted by multicast or broadcast. The multicast count is incremented each time that the multicast/broadcast bit is set in the destination MAC address of a transmitted frame.

"FailedCount" provides the number of NIC frame transmissions that failed after exceeding either the short frame or the long frame retry limits.

"RetryCount" provides the number of frames that the NIC successfully retransmitted after one or more retransmission attempts.

"MultipleRetryCount" provides the number of frames that the NIC successfully retransmitted after more than one retransmission attempt.

"RTSSuccessCount" provides the number of times that the NIC received a "clear to send" (CTS) in response.

"RTSFailureCount" provides the number of times that the NIC did not receive a CTS in response to a "request to send" (RTS).

"ACKFailureCount" provides the number of times that the NIC expected an acknowledgment (ACK) that was not received.

"FrameDuplicateCount" provides the number of duplicate frames that were received. The sequence control field in the frame identifies duplicate frames.

"ReceivedFragmentCount" provides the number of data and management fragments that the NIC successfully received. The ReceivedFragmentCount is incremented each time that either a data fragment or a management fragment is received.

"MulticastReceivedFrameCount" provides the number of received frames that were set to multicast or broadcast. The MulticastReceivedFrameCount is incremented each time the NIC receives a frame with the multicast/broadcast bit set in the destination MAC address.

"FCSErrorCount" provides the number of frames the NIC received that contained frame check sequence (FCS) errors.

According to an embodiment, a network monitor 204 is coupled to NDIS interface 203 to receive one or more statistical parameters. Network monitor 204 can be part of the operating system and run in kernel mode. Further, network monitor 204 can operate as a class based module that receives the statistical parameters as objects according within the operating system requirements. As explained in further detail below, statistics engine 206 receives the statistical parameters and performs operations on the parameters to determine probabilities, such as collision probabilities. The probabilities are transmitted to adaptive parameter engine 208 for determining new parameters for the media access control (MAC) layer as maintained by the NDIS interface 203 to provide quality of service (QoS) differentiation.

Figure 3:
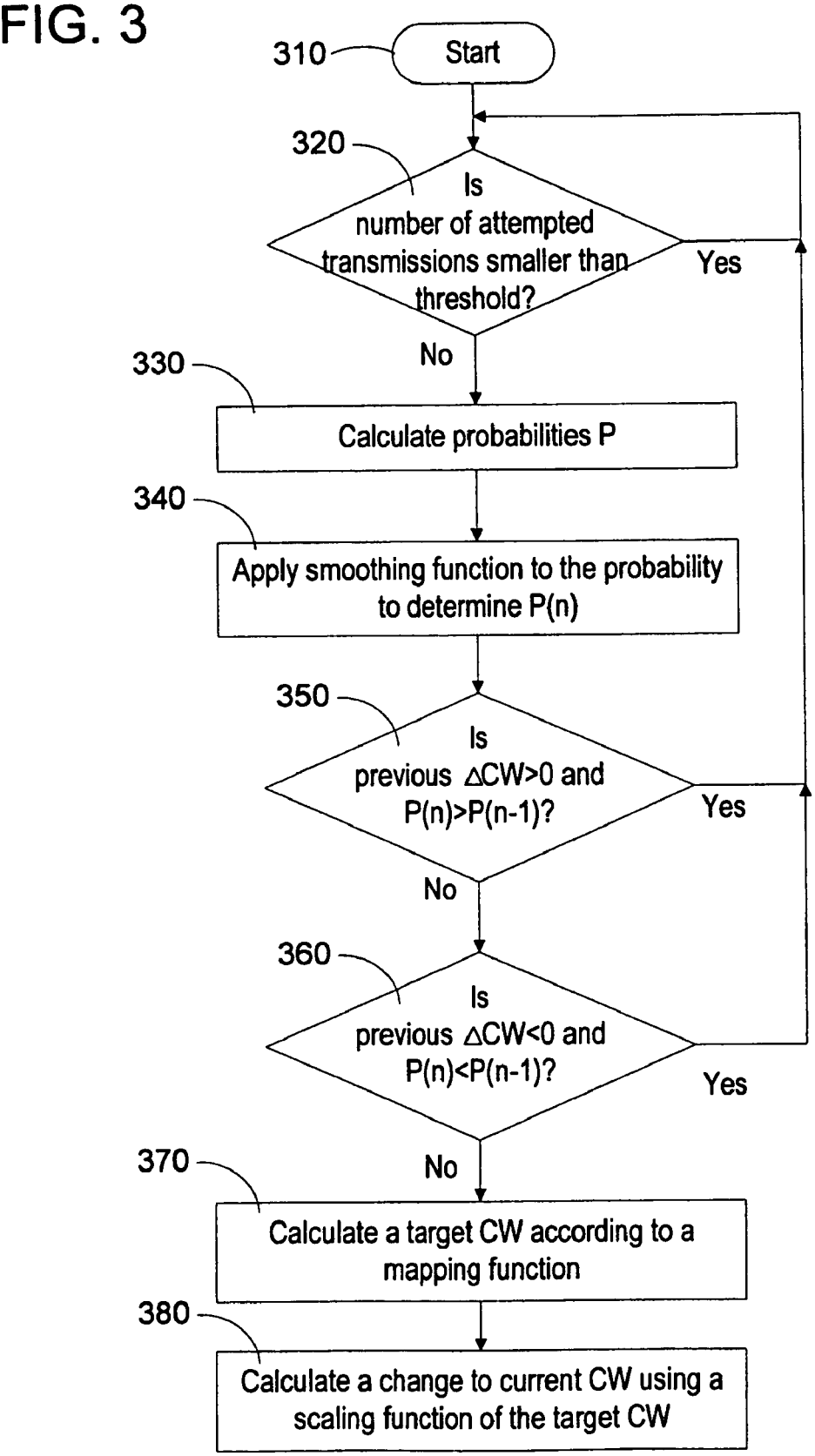
FIG. 3 is a flow diagram illustrating a method according to an embodiment of the present invention.

Referring now to FIG. 3 in combination with FIG. 2, a flow diagram illustrates an embodiment directed to providing QoS differentiation in wireless local area networks (WLANs). The flow diagram is directed to an adaptation for the media access control (MAC) layer of an Institute of Electronic and Electrical Engineers (IEEE) 802.11 implementation of a WLAN.

The IEEE 802.11 protocol provides a distributed coordination function (DCF) based on a carrier sense multiple access with collision avoidance (CSMA/CA) protocol. When service differentiation among device packets or flows through a channel is required, such as for real time data flows, a method is needed to fairly and efficiently share channel resources. According to an embodiment, a method shown in FIG. 3 provides updates to the contention window (CW) that alters the contention window according to a required QoS for each device or for a predetermined data flow. According to the embodiment, the backoff period is computed using: $T_{backoff} = Rand(0, (CW \pm \Delta CW)*2^i) * T_{slot}$, wherein i is the backoff stage.

The method also provides an adaptive method for determining a CW. An adaptive method is desirable because the size limits on the CW affects WLAN system efficiency as a function of the number of transmissions attempted over a channel. If a channel is crowded, meaning that the channel is busy with devices attempting transmissions, a small fixed CW value results in a too small period of opportunity for all the devices to transmit. A small fixed CW results in collisions that waste spectrum efficiency. An increase in the CW deceases the collision probability. Also, the time cost of waiting is much smaller than the cost of collision plus backoff period. However, when a WLAN system contains only a few devices, the collision probability is quite low. Accordingly, a CW value that is too large requires a device to wait unnecessarily to transmit a frame. A decrease in the CW expedites the data transmission and increases system throughput. Therefore, depending on the number of devices at any given time and the potential for collisions, the proper CW for efficient transmission can change over time. An adaptive CW calculation is, therefore, preferred.

An adaptive CW calculation on a per device or per flow determination can be implemented as a distributed type of control for a WLAN. A distributed control system is preferred over a centralized control system because a centralized control system requires an access point (AP) to determine information about the network and is incompatible with current IEEE 802.11 DCF. In contrast, a distributed control system is compatible with current IEEE 802.11 DCF.

The method shown is implemented on a distributed basis within a user computer. As shown in FIG. 3, block 310 identifies the start of the method, which can occur every predetermined number of seconds, T, or another predetermined amount of time.

Decision block 320 provides for determining whether the number of attempted transmissions is smaller than a predetermined threshold. More particularly, network monitor 204 can retrieve a count as a parameter of the NDIS interface 203. A count from a previous adjustment to the CW can be used as a beginning point. If the number is smaller than the predetermined threshold, no alteration to the CW is required, and the method returns to counting the number of attempted transmissions.

In one embodiment, network monitor 204 checks every T seconds the values received from NDIS interface 203 RTSFailureCount and RTSSuccessCount if RTS is used or (if RTS is not used, checks ACKFailureCount and TransmittedFragmentCount) and adds the values to determine the total count. If the count is smaller than a predefined threshold N (e.g., 100), the network monitor 204 waits another T seconds and checks RTSFailureCount+RTSSuccessCount until the count from a previous adjustment is at least N.

If a threshold is greater than the predetermined threshold, the method proceeds to block 330. Block 330 provides for calculating a collision probability and, in one embodiment, also a probability of failure. To determine the probabilities, an embodiment provides for using available metrics from the NDIS interface. One of skill in the art with the benefit of this disclosure will appreciate that the metrics for determining probabilities, such as collision probabilities are determinable from other sources and are within the scope of the present invention. In one embodiment, the probabilities are determined in statistics engine 206 from parameters received either from network monitor 204 or directly from NDIS interface 203.

As described, the metrics provided in NDIS interface 203 enables probabilities to be determined. The appropriate probabilities for a given WLAN system depend on the type of WLAN system. For example, for an RTS+CTS+Data+ACK type WLAN system, the probability of failure is given by the number of failed transmissions to the total transmissions with the assumption that there were no errors except for collisions:

$$P_f = \frac{RTSFailureCount}{RTSFailureCount + RTSSuccessCount} \quad \text{Equation 1}$$

If RTS is not used, the probability of failure can be approximated by the failures divided by the total attempted transmissions:

$$P_f = \frac{ACKFailureCount}{ACKFailureCount + TransmittedFragmentCount} \quad \text{Equation 2}$$

A collision probability can be determined according to more generic metrics such as a retry count divided by a total transmitted fragment count:

$$P_c = \frac{RetryCount}{TransmittedFragmentCount} \quad \text{Equation 3}$$

Depending on system requirements, only the collision probability, only a failure probability, or both a failure probability and a collision probability can be used for embodiments herein. For closer tracking of network statistics and responsiveness, both a collision probability and a failure probability are appropriate statistics.

After a collision probability and/or a failure probability is determined, block 340 provides for applying a smoothing function to obtain an average probability and avoid making changes to the CW in response to instantaneous changes in the network that are not reflective of network behavior. One of skill in the art appreciates that there are a number of smoothing functions available for determining network characteristics over time to reduce variance. Exemplary smoothing equations can be as follows:

$$P_c(n)=\alpha P_c(n-1)+(1-\alpha)P_{c,measured}(n)$$

$$P_f(n)=\alpha P_f(n-1)+(1-\alpha)P_{f,measured}(n) \quad \text{Equation 4}$$

The symbol α represents a smoothing factor; and $P_{c,\,measured}$ and $P_{f,\,measured}$ are calculated according to current metrics provided to statistics engine 206. A WLAN NDIS interface can be structured to provide metrics for determining one, two or more of the probability statistics required for embodiments described herein as will be understood by those of skill in the art.

After a smoothed probability of failure or collision is determined, blocks 350 and 360 apply fairness determinations. Blocks 350 and 360 apply to avoid system instability and unfairness. For example, unfairness can occur by having a device that is experiencing collisions increase the CW while other devices do not. Such an increase will cause more collisions, which can cause a further increase of the CW thereby causing system instability and unfairness.

Specifically, block 350 provides for determining whether a previous change to the contention window was to increase the contention window and, if so, did the probability of a failed transmission/collision increase (ΔCW>0 and P(n)>P(n−1)). If the previous change to the contention window was to increase the size of the contention window, and the probability of a failed transmission/collision has increased from the last transmission, then block 350 provides for returning to counting transmissions and block 320. Otherwise, the method continues to block 360.

Block 360 provides for determining whether the previous change to the contention window was to decrease the size of the contention window, and, if so, did the probability of a failed transmission/collision decrease (ΔCW<0 and P(n)<P(n−1)). If the previous change to the contention window was to decrease the size of the contention window, and the probability of a failed transmission/collision decreased, block 360 provides for returning to counting transmissions and block 320. Otherwise, the method continues to block 370.

Blocks 350 and 360 provide fairness and stability by maintaining a same size contention window in certain predetermined circumstances by requiring a "stop-for-a-round." The inequalities provide a method for maintaining fairness when a device that increases a contention window and should statistically see decreased probabilities of failure and/or collision but does not. For example, if all other devices in the same class of quality of service change their contention window size according to a given probability of failure/collision, a decrease in failures and/or collisions should occur. However, if in a next round, the devices experiences increased probabilities of failure/collision, then one possibility is that other devices of the same QoS class in the WLAN did not increase their respective contention window size and that the given device is a lone victim. According to an embodiment, specifically, blocks 350 and 360, the given device holds the CW in a round to leave time for others to adjust the CW. Similar actions will be taken when decreasing CW. As a result, the fairness can be maintained statistically.

Block 370 provides for determining a target contention window for this device according to a mapping function described below with reference to FIG. 4. The mapping function provides a direction, either positive or negative, for a change to the size of the contention window. The mapping function can be different for different QoS classes, thereby providing service differentiation.

The mapping function produces a value for a target contention window. Block 380 provides for using the target contention window, a scaling function and the current contention window size to calculate a change to the contention window size. More particularly, the change to the contention window, and, consequently, the contention window, is calculated using the following equation:

$$\Delta CW = \frac{CW_{targ} - CW_{cur}}{CW_{cur}} S \quad \text{Equation 5}$$

S represents a scaling factor that can be different for different QoS classes. The scaling factor S can be divided into up scale and down scale, which are used for increasing and decreasing CW, respectively. For QoS classes with higher priority, the up scale is set to be smaller than that of lower priority; while the down scale is set to be greater than that of lower priority.

$CW_{target}$ represents a target CW value and $CW_{cur}$ is the current CW value.

Referring now to FIG. 4, a graph illustrates possible mapping functions for determining a target CW according to an embodiment. The graph illustrates a y-axis 410 identifying possible contention window sizes, labeled "Target CW". The x-axis 420 identifies probabilities from 0 to 0.35, representing either a probability of collision or failed transmission. The lines shown indicate different mapping function, with line 430 identifying a linear mapping function, line 440 identifying an exponential mapping function and line 450 identifying a quadratic mapping function. Importantly, each of the mapping functions is an increasing function, and the choice for which to apply to a given WLAN can be according to system requirements. The graph shown in FIG. 4 can be appropriate for a type of traffic class with a lower bound of a contention window $CW_{min}$, denoted as $CW_{minl}$ of 15. The upper bound of the minimum contention window $CW_{min}$ denoted as $CW_{minu}$ is 63. The corresponding probability of failure/collision, P, for the lower bound is 2% (0.02) and the probability of failure/collision for the upper bound is 30% (0.3). In an embodiment, any probabilities that are smaller than the lower bound are mapped to the $CW_{minl}$; likewise, any probabilities P that are larger than the upper bound are mapped to the $CW_{minu}$. Thus, each probability will have a target contention window size.

The range of target contention window sizes determines the quality of service for a predetermined class. Thus, differentiation is supported by the mapping function. For higher priority flows, the $CW_{minl}$ and $CW_{minu}$ can be set to be smaller than those of lower priority flows. In one embodiment, for real-time traffic:

$CW_{minl}$=15, $CW_{minu}$=63, and $P_{lower\ bound}$=2%, $P_{upper\ bound}$=30%.

For best-effort traffic:

$CW_{minl}$=31, $CW_{minu}$=127, and $P_{lower\ bound}$=2%, $P_{upper\ bound}$=30%.

There are at least two points that the mapping function must pass, the lower bound for the probability and the lower bound for the minimum contention window ($P_{fl}$, $CW_{minl}$) denoted 460; and the upper bound for the probability and the upper bound for the minimum contention window ($P_{fu}$, $CW_{minu}$) denoted 470. Between the two points, a monolithically increasing function maps the observed probability of failure/collision P to a target CW. For example, associated with the real-time flow, for a linear function:

$CW$=171.4286*$P$+11.5714 (line 430)     Equation 6

For a quadratic mapping function:

$$CW = 535.7143 * P^2 + 14.7857 \text{ (line 450)} \quad \text{Equation 7}$$

For an exponential mapping function:

$$CW = 13.5386 * \exp(5.1253 * P) \text{ (line 440)} \quad \text{Equation 8}$$

Referring back to FIG. 3 in combination with FIG. 4, according to an embodiment, after a smoothed probability of failure/collision is found in block 340, the mapping function is used to map that probability to an associated target CW, as provided in block 370. For example, if a probability of collision is determined to be 0.15 or 15%, and a linear mapping function is applied, the target CW according to FIG. 4 will be approximately 35. After a target CW is found, a change to the current CW can be calculated (block 380) by using the target CW to provide the direction of adjusting the CW. Equation 5, using both the target CW and the current CW of the station, determines the actual adjustment step size. By using a target CW to determine a direction for changing the contention window, two stations can estimate a channel with the same probabilities, but the actual step sizes for their respective contention windows can be different.

Although the transient $P_c$ and $P_f$ observed by the devices within the same class will be different and, in some cases can be as large as 15% due to the variance, the difference in $\Delta CW$ is kept in a reasonable threshold due to equation 5 giving weight to a current contention window size and to a scaling according to the quality of service for a device. Thus, equation 5 assists in maintaining user fairness.

In one embodiment, the adjustment to the contention window size adapts to converge on a steady state contention window size. More particularly, referring to FIG. 5, a graph illustrates how the method shown in FIG. 3 results in an adaptive convergence of the contention window. The graph of FIG. 5 shows a mapping function with the y-axis as possible target CW values between 15, representing a lower limit to the minimum contention window 510; and 63 representing an upper bound to the minimum contention window 520. The x-axis is shown illustrating a lower probability of failure/collision of 0.03 540, an upper probability of failure/collision of 0.30 550. Mapping function 570 is shown as an exponential type mapping function. FIG. 5 illustrates that any changes due to equation 5 occur stepwise, as is shown by stepwise line 580. Specifically, using equation 5, the larger the difference between a current contention window, $CW_{current}$ and a target contention window, $CW_{target}$, the larger the change to the contention window, $\Delta CW$. Thus, referring to FIG. 5, line 580 depicts an actual current contention window size and corresponding probability of failure/collision. As shown, the first adjustment according to the method shown in FIG. 3 results in the largest jump from point 590 to point 592. After another iteration through the method, the size of the contention window jumps from point 592 to point 594. Finally, after a third iteration, the size of the contention window jumps from point 594 to point 596. At point 596, the size of the current contention window matches the target contention window. There can be a small fluctuation of steady-state CW around the target CW. Thus, for devices for whom the initial contention window is rather small and $P_f$ is rather large, a $CW_{target}$ should be, say, as large as 63, $CW_{minu}$. As a result of an iteration through the method, the actual CW is increased. As a result of the increase, the observed probability of failure/collision decreases a little. As a result, the method determines another $CW_{target}$ that is smaller than the prior target contention window, resulting in an further increase of contention window. Finally, the $CW_{current}$ will be increased to $CW_{target}$ when P exactly corresponds to $CW_{current}$. In other words, when $CW_{current} = CW_{target}$, shown as point 596, the transmissions are in equilibrium.

Referring now to FIGS. 6-9, comparison graphs illustrate differences between an adaptive MAC layer according to embodiments herein, current MAC layer systems, and a fixed differentiation-type MAC layer system with fixed contention window sizes according to QoS requirements. The WLAN system in FIGS. 6A and 6B consists of 15 devices running real-time flows with an average bit rate of 128 kbps and 15 devices running best-effort flows. Each device communicates through an access point. The graphs assume two QoS classes: real-time and best-effort data, although one of skill in the art will appreciate that more classes can be managed in a similar manner. The real-time flow is constant bit rate (CBR) traffic, and the best-effort flow is assumed to be always active, i.e., always has frames to send. FIG. 6A illustrates the current 802.11 scheme. As shown y-axis 602 identifies a mean end-to-end delay in milliseconds; and x-axis 604 illustrates users 1-15. Line 630 identifies an 802.11 scheme, with the CW fixed to be 31 for all devices. As shown, the results using a 802.11b MAC layer as currently configured, line 630, results in some devices experiencing over a second delay and others experience 0.5 seconds delay.

FIG. 6B illustrates a y-axis 610 identifying a mean end-to-end delay in milliseconds; and a x-axis 620 illustrating users 1-15. Line 640 illustrates a fixed differentiation scheme, with CW values for the two classes fixed at 31 and 63, respectively. For comparison, the adaptive MAC layer according to embodiments herein is shown as line 650, with initial CW values for two classes set at 31 and 63, respectively.

The parameters of the adaptive MAC layer represented in line 650 using equations 4 and 5 above are configured as follows: $\alpha = 0.3$; Real-time traffic: $S_{up} = 20$, $S_{down} = 20$; Best-effort traffic: $S_{up} = 40$, $S_{down} = 10$. The mapping function is the simplest linear function; T is set at 1 second. The simulated 802.11b network is assumed to have a packet size=500 bytes and RTS is not used.

As shown, the delay of an adaptive scheme according to embodiments herein is only half of that of fixed differentiation 640. Moreover, the adaptive scheme according to embodiments herein maintains fairness across all users.

Referring now to FIG. 7, throughput through the three different types of MAC layer systems is shown. Y-axis 710 illustrates bandwidth in terms of megabytes per second. The x-axis 720 illustrates time in seconds. Line 730 illustrates an 802.11b system using current MAC layer fixed contention window sizes of 31 for all users. Line 740 illustrates using the fixed differentiation system. Line 750 illustrates an adaptive contention window according to embodiments herein. As shown, the total system throughput of an adaptive contention window method is the largest. Thus, an adaptive system can significantly reduce the delay of real-time flows, provide differentiated services and improve channel utilization. As discussed above, the adaptive methods disclosed herein reduce collisions by adaptively increasing the CW, thereby improving real-time flow QoS as well as best-effort flow throughput due to the increased system total throughput.

Figure 8:
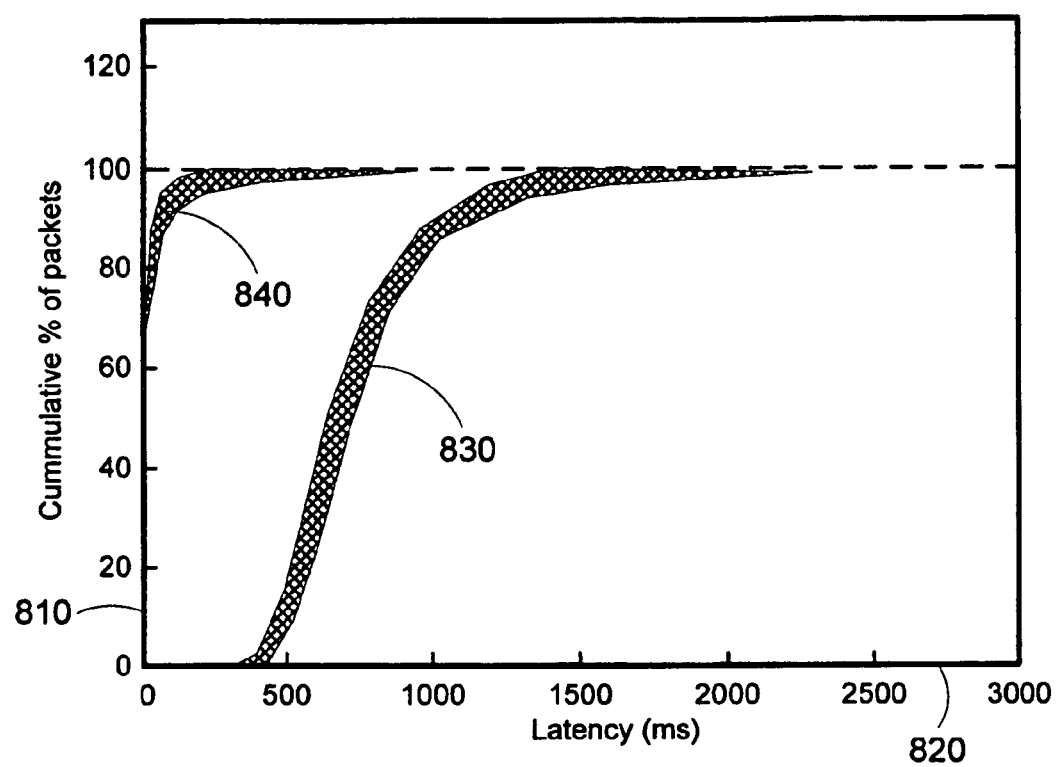
FIG. 8 is a graph illustrating a three-phase frame loss rate versus users comparing the adaptive contention window method according to embodiments of the present invention with current 802.11 transmissions and a fixed differentiation scheme.

Referring now to FIG. 8, a latency distribution is shown as a cumulative distributed function of two classes of flows operating according to embodiments described herein with adaptive contention windows. The y-axis 810 provides a cumulative percentage of packets; the x-axis 820 provides a latency metric in milliseconds. The simulation includes devices running real-time flows with an average bit rate of 128 kbps and devices running best-effort flows. As shown, a distributed adaptive MAC layer according to embodiments herein results in the two classes 830 and 840 being differentiated with the curves grouped tightly. The tight grouping indicates that the devices within each class receive fair treatment.

Figure 9:
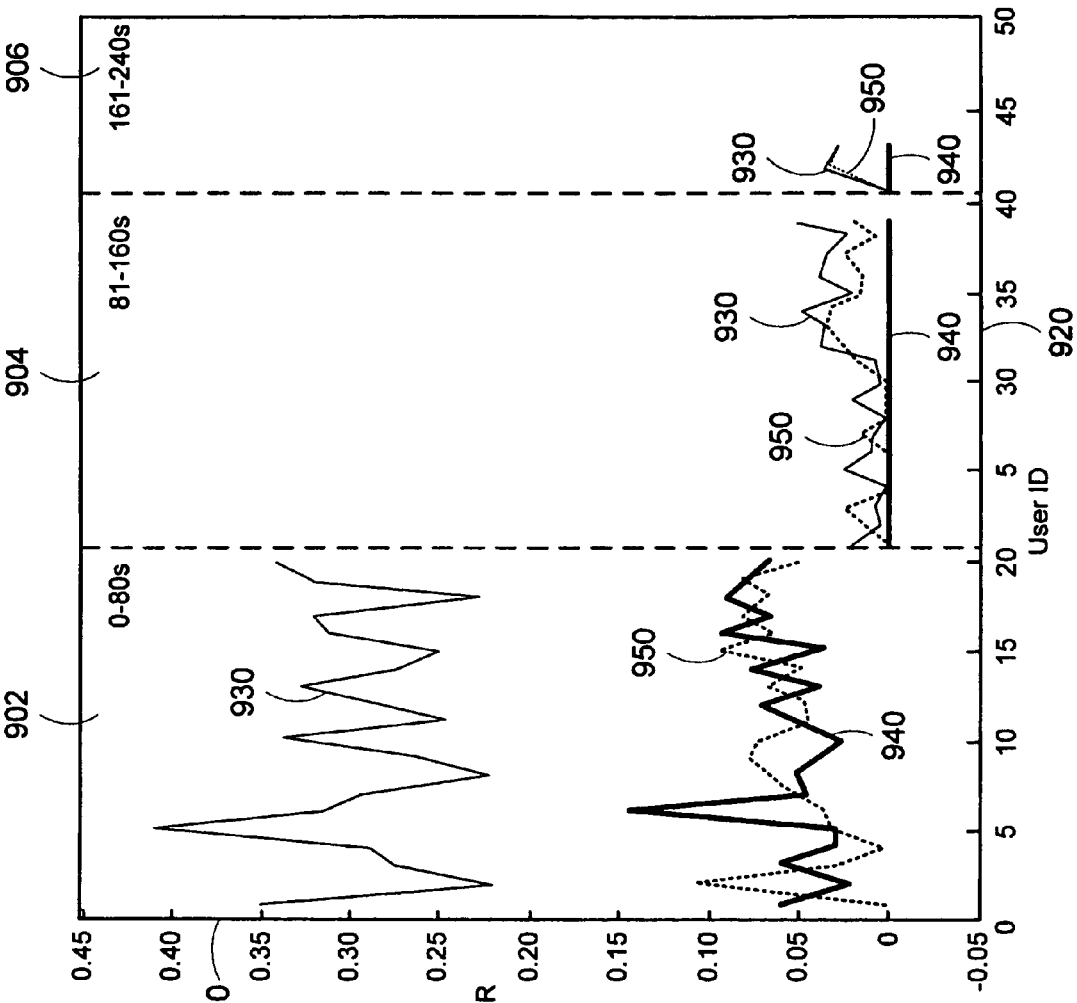
FIG. 9 is a graph illustrating the cumulative percentage of packets transmitted versus latency according to an embodiment of the present invention.

Referring now to FIG. 9, another simulation illustrates a comparison between an adaptive contention window system according to an embodiment, the current 802.11b MAC layer system, and a fixed differentiation system. FIG. 9 illustrates a join-and-leave scenario with packet sizes of 500 bytes and RTS. The y-axis 910 provides a frame loss rate (FLR) for the real-time flows; the x-axis 920 identifies users 1 through 50. The simulation illustrates three 80-second stages, 902, 904 and 906 at different time periods. More particularly, each stage is simulated for 80 seconds, including 20 best-effort flows and 20 real-time flows (100 kbps each) 902; followed by ten real-time flows (100 kbps each) and nine real-time flows (200 kbps each) 904; followed by one real-time flow (100 kbps) and two real-time flows (1.4 Mbps) 906.

As shown, the first stage 902 results in adaptive contention window 940 and fixed differentiation system 950 achieving much better FLR than the 802.11b system with a fixed contention window 930. In the second and third stages, the adaptive contention window system according to embodiments herein 940 achieves a FLR of zero while the other two systems both yield an FLR of approximately 5%.

In view of the many possible embodiments to which the principles of this invention can be applied, it will be recognized that the embodiment described herein with respect to the drawing figures is meant to be illustrative only and are not be taken as limiting the scope of invention. For example, those of skill in the art will recognize that the elements of the illustrated embodiment shown in software can be implemented in hardware and vice versa or that the illustrated embodiment can be modified in arrangement and detail without departing from the spirit of the invention. Therefore, the invention as described herein contemplates all such embodiments as can come within the scope of the following claims and equivalents thereof.

We claim:

1. A method for providing differentiated quality of service (QoS) in a time slotted network, the method comprising:
   calculating by a computing device, a transmission failure probability for a transmission over the time slotted network, wherein the transmission failure probability comprises a ratio of failed transmissions to attempted transmissions;
   determining a contention window target value for a contention window according to a mapped function of the transmission failure probability;
   altering the contention window stepwise according to a scaling function of the contention window target value, the scaling according to the QoS for the transmission; and
   retrieving statistical data from a network driver interface for the time slotted network,
   wherein the statistical data retrieved from the network driver interface provides the transmission failure probability, and wherein the time slotted network is a wireless local area network (WLAN) following an Institute of Electrical and Electronics Engineers (IEEE) 802.11 protocol;
   wherein the altering the contention window further comprises determining a new contention window for the transmission, and
   wherein the new contention window is determined by applying a change to a prior contention window, the change determined according to:

$$\Delta CW = \frac{CW_{targ} - CW_{cur}}{CW_{cur}} S,$$

wherein $\Delta CW$ represents the amount by which to change the prior contention window, $CW_{targ}$ represents the contention window target value, $CW_{cur}$ represents the prior contention window, and S represents the scaling function.

2. The method of claim 1 further comprising altering the contention window when (1) a prior change to the contention window was an increase and the transmission failure probability is less than a prior transmission failure probability and (2) the prior change to the contention window was a decrease and the transmission failure probability is greater than the prior transmission failure probability.

3. The method of claim 1 wherein repeated altering of the contention window over time converges the contention window to the contention window target value.

4. The method of claim 1 further comprising repeating the altering of the contention window according to predetermined parameters, the predetermined parameters including one or more of a time and a number of attempted transmissions.

5. The method of claim 1 wherein the contention window target value is a contention window target value for a Carrier Sense Multiple Access with Collision Avoidance (CSMA/CA) wireless local area network WLAN.

6. The method of claim 1 wherein the mapped function of the transmission failure probability scales the contention window target value according to the QoS for the transmission.

7. The method of claim 1, wherein the statistical data retrieved from the network driver interface enables a statistics engine to determine the failure probability.

8. The method of claim 1 wherein the calculating the transmission failure probability further comprises smoothing the transmission failure probability.

9. The method of claim 8 wherein the smoothing is according to $P(n)=\alpha P(n-1)+(1-\alpha)P_{measured}(n)$, wherein $P_{measured}$ represents a measured transmission failure probability and $\alpha$ represents a smoothing factor with a value between 0 and 1.

10. The method of claim 1, wherein the contention window target value is a linear function of the transmission failure probability.

11. The method of claim 1, wherein the contention window target value is a nonlinear function of the transmission failure probability.

12. The method of claim 11, wherein the contention window target value is a quadratic function of the transmission failure probability.

13. The method of claim 11, wherein the contention window target value is an exponential function of the transmission failure probability.

14. The method of claim 1, wherein repeated alteration of the contention window converges the contention window stepwise to the contention window target value and a magnitude of each step tends to be less as the contention window converges.

15. The method of claim 1, wherein:
   altering the contention window stepwise comprises a plurality of altering steps; and
   the method further comprises making at least one fairness determination before each altering step.

16. The method of claim 15, wherein said at least one fairness determination comprises:
   determining a contention window change; and
   determining a transmission failure probability change.

17. The method of claim 15, wherein said at least one fairness determination comprises a plurality of fairness determinations, and each of the plurality of fairness determinations comprises:
   determining a contention window change; and
   determining a transmission failure probability change.

18. The method of claim 17, wherein a first of the plurality of fairness determinations comprises:
   determining if the contention window has increased; and
   determining if the transmission failure probability has increased.

19. The method of claim 18, wherein a second of the plurality of fairness determinations comprises:
   determining if the contention window has decreased; and
   determining if the transmission failure probability has decreased.

20. A method for ensuring fairness in a wireless time slotted network, the method comprising:
   calculating by a computing device, a transmission failure probability for transmitting over the wireless time slotted network, wherein the transmission failure probability comprises a ratio of failed transmissions to attempted transmissions;
   determining a target contention window value for determining a stepwise change to a contention window by mapping the transmission failure probability to a range of target contention window values, the range according to a differentiated quality of service (QoS) for a transmissions; and
   repeatedly altering the contention window for transmissions stepwise according to the determined stepwise change to the contention window, each step occurring after a predetermined number of attempted transmissions and in accordance with one or more fairness metrics;
   wherein the repeated altering of the contention window further comprises repeatedly determining a new contention window for the transmission, and
   wherein each new contention window is determined by applying a change to a prior contention window, the change determined according to:

$$\Delta CW = \frac{CW_{targ} - CW_{cur}}{CW_{cur}} S,$$

wherein $\Delta CW$ represents the amount by which to change the prior contention window, $C_{targ}$ represents the target contention window value, $CW_{cur}$ represents the prior target contention window, and S represents the scaling function.

21. The method of claim 20, wherein the fairness metrics comprise:
   (1) a determination that a prior change to the contention window was an increase and the transmission failure probability is less than a prior transmission failure probability; and
   (2) a determination that the prior change to the contention window was a decrease and the transmission failure probability is greater than the prior transmission failure probability.

22. The method of claim 20 further comprising smoothing the transmission failure probability according to $p(n)=\alpha P(n-1)+(1-\alpha)P_{measured}(n)$, wherein $P_{measured}$ represents a measured transmission failure probability and $\alpha$ represents a smoothing factor with a value between 0 and 1.

23. A computer-readable storage medium having computer-executable instructions to perform a method for providing differentiated quality of service (QoS) in a time slotted network, the method comprising:
   calculating a transmission failure probability for a transmission over the time slotted network, wherein the transmission failure probability comprises a ratio of failed transmissions to attempted transmissions;
   determining a contention window target value for a contention window according to a mapped function of the transmission failure probability; and
   altering the contention window stepwise according to a scaling function of the contention window target value, the scaling according to the QoS for the transmission;
   wherein the altering the contention window further comprises determining a new contention window for the transmission, and
   wherein the new contention window is determined by applying a change to a prior contention window, the change determined according to:

$$\Delta CW = \frac{CW_{targ} - CW_{cur}}{CW_{cur}} S,$$

wherein $\Delta CW$ represents the amount by which to change the prior contention window, $CW_{targ}$ represents the contention window target value, $CW_{cur}$ represents the prior contention window, and S represents the scaling function.

24. The computer readable storage medium of claim 23 the method further comprising altering the contention window when (1) a prior change to the contention window was an increase and the transmission failure probability is less than a prior transmission failure probability and (2) the prior change to the contention window was a decrease and the transmission failure probability is greater than the prior transmission failure probability.

25. The computer readable storage medium of claim 23 wherein repeated altering of the contention window over time converges the contention window to the contention window target value.

26. The computer readable storage medium of claim 23 the method further comprising repeating the altering of the contention window according to predetermined parameters, the predetermined parameters including one or more of a time and a number or attempted transmissions.

27. The computer readable storage medium of claim 23 wherein the contention window target value is a contention window target value for a Carrier Sense Multiple Access with Collision Avoidance (CSMA/CA) wireless local area network WLAN.

28. The computer readable storage medium of claim 23 wherein the mapped function of the transmission failure probability scales the contention target window value according to the QoS for the transmission.

29. The computer readable storage medium of claim 23 further comprising retrieving statistical data from a network driver interface for the network.

30. The computer readable storage medium of claim 29 wherein the statistical data retrieved from the network driver interface provides the transmission failure probability.

31. The method of claim 29 wherein the statistical data retrieved from the network driver interface enables a statistics engine to determine the transmission failure probability.

32. The computer readable storage medium of claim 23 wherein the calculating the transmission failure probability further comprises smoothing the transmission failure probability.

33. The computer readable storage medium of claim 32 wherein the smoothing is according to $P(n)=\alpha P(n-1)+(1-\alpha)P_{measured}(n)$, wherein $P_{measured}$ represents a measured transmission failure probability and $\alpha$ represents a smoothing factor with a value between 0 and 1.

34. A computer readable storage medium having computer-executable instructions to perform a method for ensuring fairness in a wireless time slotted network, the method comprising:
  calculating a transmission failure probability for transmitting over the wireless time slotted network, wherein the transmission failure probability comprises a ratio of failed transmissions to attempted transmissions;
  determining a target contention window value for determining a stepwise change to a contention window by mapping the transmission failure probability to a range of target contention window values, the range according to a differentiated quality of service (QoS) for a transmissions; and
  repeatedly altering the contention window for transmissions stepwise according to the determined stepwise change to the contention window, each step occurring after a predetermined number of attempted transmissions and in accordance with one or more fairness metrics;
  wherein the repeated altering the contention window further comprises repeatedly determining a new contention window for the transmission, and
  wherein each new contention window is determined by applying a change to a prior contention window, the change determined according to:

$$\Delta CW = \frac{CW_{targ} - CW_{cur}}{CW_{cur}} S,$$

wherein $\alpha CW$ represents the amount by which to change the prior contention window, $CW_{targ}$ represents the target contention window value, $CW_{cur}$ represents the prior contention window, and S represents the scaling function.

35. The computer readable storage medium of claim 34 wherein the fairness metrics comprise:
  (1) a determination that a prior change to the contention window was an increase and the transmission failure probability is less than a prior transmission failure probability; and
  (2) a determination that the prior change to the contention window was a decrease and the transmission failure probability is greater than the prior transmission failure probability.

36. The computer readable storage medium of claim 34 further comprising smoothing the transmission failure probability according to $P(n)=\alpha P(n-1)+(1-\alpha)P_{measured}(n)$, wherein $P_{measured}$ represents a measured transmission failure probability and $\alpha$ represents a smoothing factor with a value between 0 and 1.

* * * * *